United States Patent
Keen et al.

(10) Patent No.: US 6,786,987 B2
(45) Date of Patent: Sep. 7, 2004

(54) METHOD AND APPARATUS FOR PERFORMING CONTINUOUS MOTION INTERMITTENT ULTRASONIC SEALING

(75) Inventors: Bruce W. Keen, Cleveland, TN (US); Alex Hanna, Cleveland, TN (US)

(73) Assignee: Mars Incorporated, McLean, VA (US)

( * ) Notice: Subject to any disclaimer, the term of this patent is extended or adjusted under 35 U.S.C. 154(b) by 37 days.

(21) Appl. No.: 10/230,216

(22) Filed: Aug. 29, 2002

(65) Prior Publication Data

US 2004/0040639 A1 Mar. 4, 2004

(51) Int. Cl.⁷ .................................. B29C 65/08
(52) U.S. Cl. ............... 156/64; 156/73.1; 156/292; 156/361; 156/580.1; 156/580.2
(58) Field of Search .................. 156/64, 73.1, 290, 156/292, 308.2, 308.4, 361, 544, 580.1, 580.2

(56) References Cited

U.S. PATENT DOCUMENTS

| | | | |
|---|---|---|---|
| 4,517,790 A | 5/1985 | Kreager | 53/552 |
| 4,534,818 A | 8/1985 | Kreager | 156/466 |
| 4,767,492 A | 8/1988 | Fukusima et al. | 156/580.2 |
| 5,183,523 A * | 2/1993 | Rinehart | 156/367 |
| 5,775,055 A | 7/1998 | Giacomelli et al. | 53/371.2 |
| 5,976,315 A | 11/1999 | Martin | 156/580.2 |
| 6,139,479 A | 10/2000 | Heiliger | 493/22 |
| 6,319,184 B1 | 11/2001 | DeMatteis et al. | 493/186 |

FOREIGN PATENT DOCUMENTS

| | | |
|---|---|---|
| EP | 1163998 | 12/2001 |
| FR | 2787058 | 6/2000 |
| WO | WO 98/49062 | 11/1998 |

* cited by examiner

*Primary Examiner*—James Sells
(74) *Attorney, Agent, or Firm*—Fitzpatrick, Cella, Harper & Scinto

(57) ABSTRACT

A method and apparatus are provided for sealing packaging material using ultrasonic technology. The method includes the steps of supplying the packaging material to a sealing station that includes an anvil and horn, and sealing the packaging material. The apparatus is a cam-shaped, rotatable anvil where the rate of rotation of the anvil can be changed based upon the speed of an AC Servo driving the anvil and the desired spacing between the seals.

11 Claims, 2 Drawing Sheets

METHOD AND APPARATUS FOR PERFORMING CONTINUOUS MOTION INTERMITTENT ULTRASONIC SEALING

BACKGROUND OF THE INVENTION

1. Field of the Invention

The present invention relates to a method and apparatus for the sealing of packages, and particularly to a method and apparatus for sealing packages using continuous motion intermittent ultrasonic sealing technology.

2. Related Background Art

The prior art discloses commonly-used hot sealing and cold sealing technology to seal packages. For example, U.S. Pat. No. 6,319,184 B1 (DeMatteis et al.) describes a process for cold sealing two layers of plastic film material together. The bag formed by the DeMatteis invention has a closed bottom, a continuously closed periphery, and an open top. The bag is provided with a cold seal, which does not form a part of the closed bottom or continuous closed periphery of the bag. The first and second layers of the bag must be opposed to each other so that proper sealing of the two layers may occur. Compression dies are provided on at least one side of the juxtaposed first and second layers, and the compression dies are sized accordingly to provide the desired size and shape of the cold seal. Thereafter, the compression dies are impressed across the juxtaposed first and second layers at a temperature and pressure sufficient to fuse the first and second layers together. However, the compression dies are impressed at an insufficient temperature and pressure to permanently fuse the first and second layers so that the layers, when separated at the cold seal, retain their structural integrity. In DeMatteis et al., a hot seal is generally described as a seal that will not part because the two layers of plastic were sealed together under a temperature and pressure where the molecular structure of the two plastic layers was permanently bonded and fused together. Moreover, in DeMatteis et al., a cold seal is generally described as, in essence, an imperfect hot seal, where the cold seal occurs when an insufficient temperature or pressure is used to seal the two layers (see, e.g., the specification at col. 1, line 57 to col. 2, line 38).

The prior art also discloses commonly-used anvil and ultrasonic horn components that are used to seal packages. For example, U.S. Pat. No. 5,976,315 (Martin) describes a stationary anvil for an ultrasonic sealing unit for sealing at least two sections composed of a plastic coated material, where the ultrasonic sealing unit comprises a sonotrode movable relative to the anvil. In Martin, the anvil has an anvil body with a sealing surface at a front of the body. The sealing surface has raised and indented areas where the raised areas are configured as narrow ribs. One of the ribs is a lower retaining rib running along a free lower edge of the sealing surface. Another of the ribs is a central sealing rib, which is located above and parallel to the lower retaining rib, and extends across the entire width of the sealing surface.

U.S. Pat. No. 5,775,055 (Giacomelli et al.) describes an anvil system that includes a plurality of stationary anvils having an interconnected cooling system. Each of the anvils has a means for acoustically insulating the anvil body from ultrasonic energy which originates from an ultrasonic horn. The insulation means may be an airspace slot that essentially separates the vibrating portion of the anvil from the anvil body. In Giacomelli et al., the invention provides a seal, for example, on a gable-type closure, which is used, for example, on the top of milk cartons. Here, the top fin is captured between an ultrasonic sealing horn and an anvil, and ultrasonic energy is transduced from the horn to the joint, which causes the heat-sealable material in the fin to fuse, thereby forming a seal.

U.S. Pat. No. 4,767,492 (Fukusima et al.) describes an ultrasonic sealing apparatus where pairs of sheet-like members at a bottom portion of a tubular member are fuse-bonded together by frictional heat that is generated by ultrasonic vibration. The apparatus includes a horn (see, e.g., FIG. 3, reference numeral 1) and anvil (see, e.g., FIG. 3, reference numeral 2) that were interposed with the material to be fuse-bonded together. The horn and anvil provide contact surfaces (see, e.g., FIG. 3, reference numeral 3) in contact with the material to be fused. Each of the contact surfaces is formed with a plurality of grooves (see, e.g., FIG. 1B, reference numeral 4) to provide a plurality of protrusions (see, e.g., FIG. 1B, reference numeral 5). Each of the protrusions has a flat upper surface and slanted side surfaces (see, e.g., FIG. 1B, reference numeral 6), so that the protrusion has a trapezodial cross-section. The horn applies ultrasonic vibration to the fuse-bonding surfaces of the material to be fused in a direction parallel therewith in association with the anvil.

U.S. Pat. No. 4,517,790 (Kreager) describes an apparatus and method for the continuous rotary ultrasonic sealing of packages. The apparatus utilizes a rotary anvil and cutter knife and an ultrasonic horn that has an adjustable, simulated, rotary motion that moves in synchronism with the anvil for providing an end seal on packages.

U.S. Pat. No. 4,534,818 (Kreager et al.) describes an automatic form-and-fill packaging machine that is adapted to ultrasonically seal bags made from ultrasonically sealable flexible packaging material. A method to utilize the machine is also described. In Kreager et al., a packaging machine is provided with a first ultrasonic back seal forming unit that produces a continuous longitudinal back seal on the bag, and a second ultrasonic sealing unit, which is provided in a pair of jaw members and are adapted to form the end seals of the bag perpendicular to the direction of travel of the packaging material. The second ultrasonic sealing unit is provided with a horn and a stationary anvil in opposing jaw members, such that when the jaws are shut, the flexible packaging material is tensioned against the sealing areas to form the end seals.

The references discussed above do not disclose or suggest a method and apparatus capable of sealing packages using continuous motion intermittent ultrasonic sealing. Such a sealing method and apparatus would be highly desirable.

SUMMARY OF THE INVENTION

This invention is directed to a method and apparatus for the sealing of packages, and particularly a method and apparatus for sealing packages using continuous motion intermittent ultrasonic sealing technology.

It is therefore an object of the present invention to provide a new and useful method and apparatus for sealing packaging material using ultrasonic technology. The packaging material is supplied to an anvil and horn-sealing station. The anvil has a cam shape and, in a preferred embodiment, can be caused to rotate, respective to a horn, by an AC servo that has digital feedback capabilities to change the rotating speed of the anvil. In addition, the rate of rotation of the anvil can be changed based on the desired spacing by the user between seals and the horn. The horn, which is preferably stationary, provides an ultrasonic vibration to the packaging material. The packaging material is sealed between the anvil and the horn. The desired spacing between seals may be varied by adjusting the rate of anvil rotation and/or speed at which the packaging material passes between the anvil and horn. The packaging material may be provided continuously and passes between the horn and anvil at speeds in excess of 500 feet of packaging material per minute.

DETAILED DESCRIPTION OF THE PREFERRED EMBODIMENTS

Figure 1:
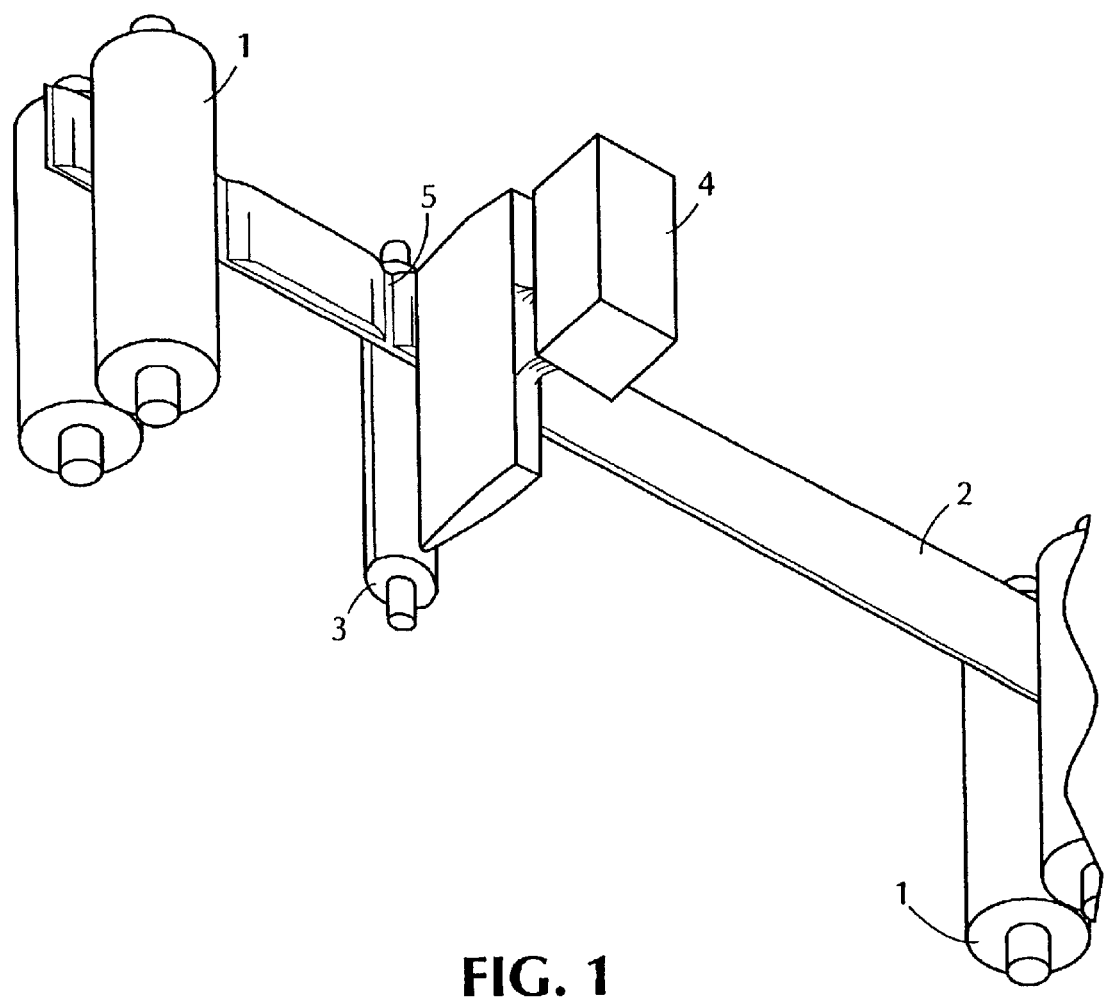
FIG. 1 is a drawing showing a side view of the components of the present invention.

FIG. 1 is a bottom, and to the side, view showing the components of the apparatus of the present invention. Standard-type rollers 1 allow the packaging material 2 to be sealed to travel to and from a sealing station. The types of packaging material 2 that may be used in the method of this invention include, for example, plastic, paper, nylon, polyester, polyethylene, polypropylene, urethane, saran, surlyn, and similar materials. The packaging material 2 passes through the sealing station, which is comprised of an anvil 3 and horn 4, and a seal 5 is created.

Figure 2:
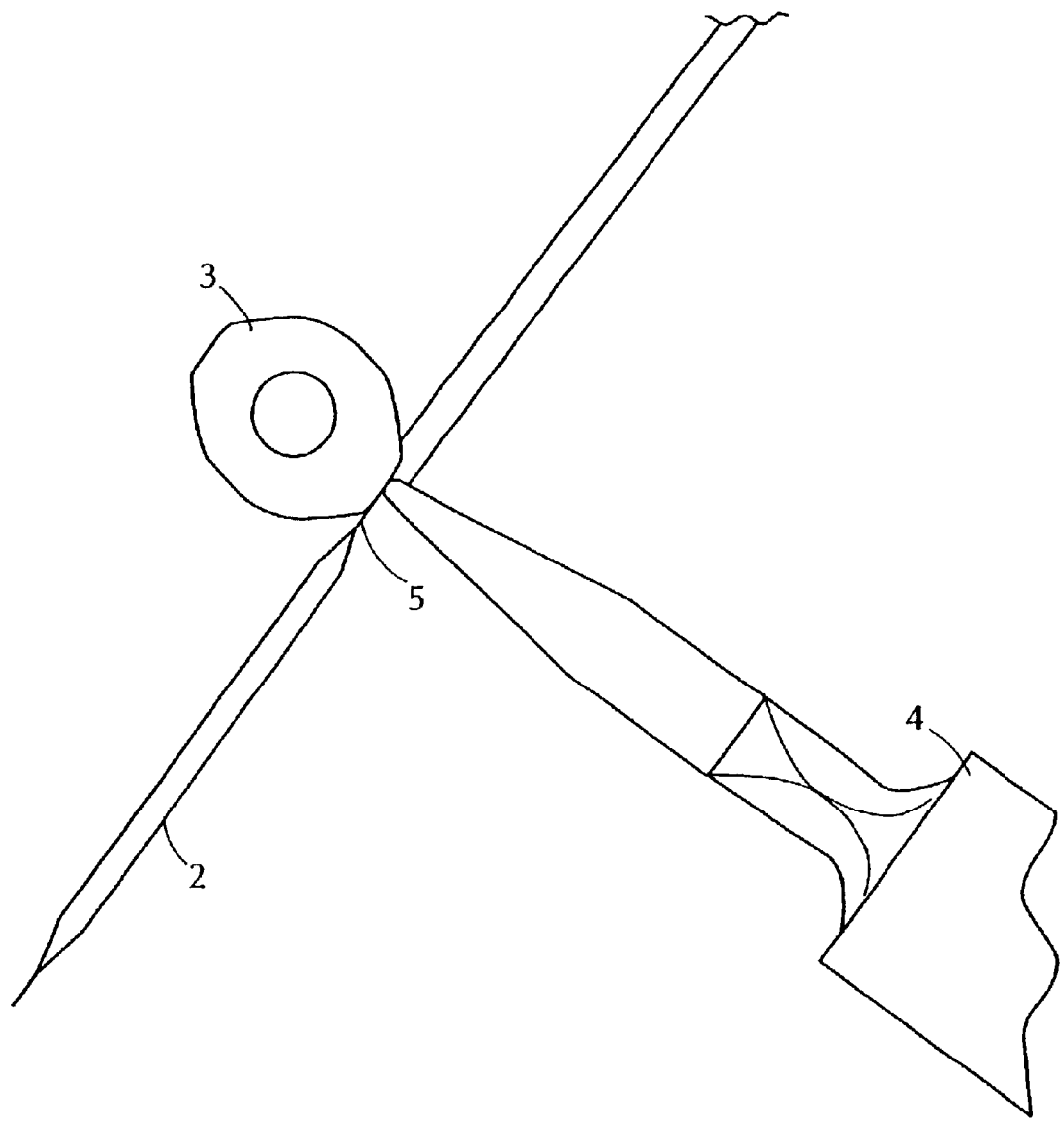
FIG. 2 is a drawing showing a top view of the components of the present invention.

FIG. 2 is a top view of a preferred apparatus of this invention showing the packaging material 2, anvil 3, horn 4, and seal 5.

Starting from the right side of FIG. 1, the packaging material 2 flows from the right to the left, through the rollers 1 and to the point where the anvil 3 and horn 4 create a seal 5. The seal 5 is created when the ultrasonic energy is sent from the horn 4, through the packaging material 2, and to the anvil 3, which causes the packaging material 2 to fuse and form a seal 5.

The orientation of the packaging material 2, and thus the rollers 1 and sealing station, i.e., the anvil 3 and horn 4, may be varied as desired. Preferably, the packaging material 2 travels in a horizontal direction through the apparatus with the surface plane of the packaging material being vertically oriented. Of course, other orientations will be apparent to those skilled in the art.

Significantly, the rotatable anvil 3 of the present invention has a cam shape, as shown in FIG. 2. As used herein, the cam shape indicates that the anvil 3 is not circular, that is, the anvil 3 is elongated more, for example, in one direction as compared to a direction 90 degrees from the one direction such that when the anvil 3 is rotated the packaging material 2 will be caused to either contact the horn or not have contacted the horn depending on the position of the anvil 3. The anvil's 3 rotation may be in either a clockwise or counter clockwise direction, depending on the direction the packaging material 2 is moving. Morever, while not preferable, it should be clear that the anvil's 3 rotation does not require a 360-degree rotation, but need be only enough movement around the axis of rotation to disengage or engage the packaging material 2 with the horn 4. In a preferred embodiment, the anvil 3 is driven by an AC Servo (not shown) that has digital feedback capabilities and allows intermittent seals 5 to be created with different spacing between the seals 5 based on the rotating speed of the anvil 3 and the speed of the packaging material. Significantly, by adjusting these parameters, the user may achieve the desired spacing based on his packaging needs. Preferably, the desired spacing is adjusted by varying the frequency of rotation while maintaining the speed of the packaging material supplied substantially constant. In addition, in a preferred embodiment, the horn 4 is stationary and provides the ultrasonic vibration to the anvil 3. A person of ordinary skill in the art will readily understand that the horn 4 can be caused to rotate or move laterally in relation to the anvil 3.

An example of the preferred embodiment of the present invention will now be described to assist a person with ordinary skill in the art to understand its benefits. A person makes confectionary products such as, for example, chocolate candies, where each candy is approximately a ¼-inch in diameter, and uses the package sealing system of the preferred embodiment of the present invention to seal the packages. A customer orders 10,000 packages of these chocolate candies, 5,000 of which the customer wants packaged in small packages, 3,000 in medium-sized packages, and 2,000 in large packages. For this example, we assume the packaging material 2 will be the same for each package. However, due to the different sizes of each package the seal 5 will be spaced 3-inches, 6-inches and one-foot apart for the small, medium, and large packages, respectively. By employing the preferred embodiment of the present invention, a user will set up the components of the system for sealing the smaller packages first, that is, the user will, among other things, ensure that there is a continuous supply of packaging material 2 to package the 10,000 packages of chocolate candies and ensure that the AC servo driving the anvil 3 is set at a fast speed to rotate the anvil 3 faster and provide closer spacing between the seals 5. (As used herein, the word "supply" means providing the packaging material 2 to the sealing station.) Each one of the packages will then pass through this system and the seal 5 will be created for each of these packages as the packaging material 2 moves to the point where the elongated section of the anvil 3 is positioned to cause the packaging material 2 to contact the horn 4. The first 5,000 small packages will be sealed with 3-inch spacing between each seal 5 and then subsequently, without having to change any of the system's components, the user can simply decrease the AC Servo's speed, thereby causing the anvil 3 to rotate more slowly and increasing the spacing between the seals 5 of the packaging material 2 from 3-inches for the small packages to 6-inches for the medium-sized packages. The next 3,000 medium size packages will then be sealed and again, without having to change any of the system's components, the user can simply decrease the AC Servo's speed, thereby causing the anvil 3 to rotate more slowly and increasing the spacing between the seals 5 of the packaging material 2 from 6-inches for the medium packages to one foot for the large packages. Simply put, the preferred embodiment of the present invention allows the sealing distance between seals 5 to be changed without changing the system's components, thus reducing the labor costs involved in operating this system. In addition, the seals 5 can be created at very high speeds. For example, during simulated testing of the preferred embodiment of the present invention, seals 5 have been created at speeds in excess of 500 feet of packaging material 2 per minute.

The preferred embodiment of the present invention describes an anvil 3 that has a cam shape, and FIGS. 1 and 2 show an anvil 3 with two elongated sections. However, a person of ordinary skill in the art will readily understand that the anvil 3 can utilize other shapes that comprise, for example, more than two, or only one, elongated sections so that the distance between the seals 5 can be lesser or greater, respectively, without having to change the speed of the AC Servo. In addition, a similar person of ordinary skill in the art will further understand that an AC Servo, or similar device, can be used to impart a horizontal rather than a rotational movement on the anvil 3, where the horizontal movement momentarily brings the anvil 3 into contact with the horn 4 to create a seal 5 and then moves the anvil 3 away from the horn 4 to allow the packaging material 2 to continue to move throughout the system.

A seal 5 of the preferred embodiment will be formed when the elongated section from the center point of the anvil 3 causes the packaging material 2 to compress against the horn 4 and the ultrasonic energy sent from the horn 4 to the anvil 3 creates the seal 5. FIGS. 1 and 2 show side seals 5 being created. However, a person of ordinary skill in the art will also readily understand that the embodiments of the present inventions can create seals 5 on the top or bottoms of the packaging material 2, and work in combination with other sealing systems to seal the entirety of a package.

Other modifications and variations of this invention will be obvious to those skilled in the art. The invention is not limited except as set forth in the following claims.

What is claimed is:

1. A method for sealing packaging material using ultrasonic technology, said method comprising the following steps:
   i) passing a packaging material between a rotatable cam-shaped anvil and an ultrasonic horn, and
   ii) intermittently sealing the packaging material as it passes between the anvil and the horn by rotating the anvil to cause the packaging material to contact the horn,
   wherein a desired spacing between seals may be varied by adjusting the rate of anvil rotation and/or speed at which the packaging material passes between the anvil and horn.

2. The method according to claim 1, wherein the packaging material is passed between the horn and anvil at speeds in excess of 500 feet of packaging material per minute.

3. The method according to claim 1, wherein the packaging material is provided continuously.

4. The method according to claim 1, wherein the horn is stationary.

5. The method according to claim 1, wherein an AC servo is used to rotate the anvil, the AC servo having digital feedback capabilities to change the rotating speed of the anvil.

6. The method according to claim 1, wherein the speed of the packaging material remains constant and the desired spacing is obtained by adjusting the rate of anvil rotations.

7. An ultrasonic sealing apparatus comprising:
   a first pair of rollers positioned to guide a packaging material to an ultrasonic sealing station, the station comprising a rotatable cam-shaped anvil and a stationary horn positioned to allow the packaging material to pass between the anvil and horn, and
   a second pair of rollers positioned to receive the packaging material after passage through the ultrasonic sealing station.

8. The ultrasonic sealing apparatus according to claim 7, wherein the packaging material may be passed between the horn and anvil at speeds in excess of 500 feet of packaging material per minute.

9. The ultrasonic sealing apparatus according to claim 7, wherein the packaging material is supplied continuously.

10. An ultrasonic sealing apparatus comprising:
    a first pair of rollers positioned to guide a packaging material to an ultrasonic sealing station, the station comprising a rotatable cam-shaped anvil and a horn positioned to allow the packaging material to pass between the anvil and horn;
    a second pair of rollers positioned to receive the packaging material after passage through the ultrasonic sealing station; and
    an AC servo that is used to rotate the anvil, said AC servo having digital feedback capabilities to change the rotational speed of the anvil.

11. An ultrasonic sealing apparatus comprising:
    means for continuously supplying a packaging material to an ultrasonic sealing station, and
    means at the ultrasonic sealing station, and including a rotatable cam-shaped anvil and stationary horn, for intermittently sealing the packaging material.

* * * * *